US008440329B2

(12) United States Patent (10) Patent No.: US 8,440,329 B2
Fleury et al. (45) Date of Patent: *May 14, 2013

(54) TRANSPARENT SUBSTRATE WHICH CAN BE USED ALTERNATIVELY OR CUMULATIVELY, FOR THERMAL CONTROL, FOR ELECTROMAGNETIC ARMOUR AND FOR HEATED GLAZING

(75) Inventors: Carinne Fleury, Aubervilliers (FR); Nicolas Nadaud, Aubervilliers (FR); Sylvain Belliot, Aubervilliers (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/156,028

(22) Filed: Jun. 8, 2011

(65) Prior Publication Data

US 2011/0236663 A1 Sep. 29, 2011

Related U.S. Application Data

(63) Continuation of application No. 10/581,056, filed as application No. PCT/FR2004/050614 on Nov. 24, 2004, now Pat. No. 7,972,713.

(30) Foreign Application Priority Data

Nov. 28, 2003 (FR) ..................................... 03 13966

(51) Int. Cl.
 *B32B 15/04* (2006.01)
(52) U.S. Cl.
 USPC ........... 428/699; 428/426; 428/698; 428/701; 428/702; 428/432

(58) Field of Classification Search .................. 428/426, 428/428, 432, 468, 469, 472, 698, 699, 701, 428/702
See application file for complete search history.

(56) References Cited

U.S. PATENT DOCUMENTS

| 2,898,433 A | 8/1956 | Felt |
| 3,682,528 A | 8/1972 | Apfel et al. |
| 4,590,118 A | 5/1986 | Yatabe et al. |
| 4,610,771 A | 9/1986 | Gillery |
| 4,710,433 A | 12/1987 | Rowe et al. |
| 4,782,216 A | 11/1988 | Woodard |

(Continued)

FOREIGN PATENT DOCUMENTS

| DE | 3708577 | 9/1988 |
| DE | 197 51 711 | 5/1999 |

(Continued)

OTHER PUBLICATIONS

WO-03037056 English machine translation.*

(Continued)

*Primary Examiner* — Jennifer McNeil
*Assistant Examiner* — Lauren Colgan
(74) *Attorney, Agent, or Firm* — Oblon, Spivak, McClelland, Maier & Neustadt, L.L.P.

(57) ABSTRACT

A glazing for thermal control and heating is provided. The glazing includes a transparent substrate including glass and provided with a thin-film stack including a plurality of functional layers. The thin-film stack includes at least three silver-based functional layers. The thin-film stack has a resistance $R<1.5\Omega$ per square.

26 Claims, 3 Drawing Sheets

U.S. PATENT DOCUMENTS

| | | | |
|---|---|---|---|
| 4,786,783 A | 11/1988 | Woodard | |
| 4,799,745 A | 1/1989 | Meyer et al. | |
| 4,878,850 A | 11/1989 | Letemps et al. | |
| 4,943,140 A | 7/1990 | Woodard et al. | |
| 4,965,121 A | 10/1990 | Young et al. | |
| 4,976,503 A | 12/1990 | Woodard | |
| 4,996,105 A | 2/1991 | Oyama et al. | |
| 5,071,206 A | 12/1991 | Hood et al. | |
| 5,122,403 A | 6/1992 | Roginski et al. | |
| 5,128,513 A | 7/1992 | Byars et al. | |
| 5,169,694 A | 12/1992 | Endo et al. | |
| 5,208,095 A | 5/1993 | Nietering | |
| 5,271,994 A | 12/1993 | Termath | |
| 5,332,888 A | 7/1994 | Tausch et al. | |
| 5,355,144 A | 10/1994 | Walton et al. | |
| 5,405,680 A | 4/1995 | Chang et al. | |
| 5,418,025 A | 5/1995 | Harmand et al. | |
| 5,508,091 A | 4/1996 | Austin | |
| 5,595,825 A | 1/1997 | Guiselin | |
| 5,653,903 A | 8/1997 | Pinchok, Jr. et al. | |
| 5,677,065 A | 10/1997 | Chaussade et al. | |
| 6,007,901 A | 12/1999 | Maschwitz et al. | |
| RE37,446 E | 11/2001 | Miyazaki et al. | |
| 6,316,110 B1 | 11/2001 | Anzaki et al. | |
| 6,353,501 B1 * | 3/2002 | Woodruff et al. | 359/585 |
| 6,445,503 B1 | 9/2002 | Lingle | |
| 6,451,434 B1 | 9/2002 | Ebisawa et al. | |
| 6,592,996 B1 * | 7/2003 | Kunisada et al. | 428/432 |
| 6,625,875 B2 | 9/2003 | Sol | |
| 6,670,581 B1 | 12/2003 | Degand et al. | |
| 6,703,586 B1 | 3/2004 | Kast | |
| 6,808,606 B2 | 10/2004 | Thomsen et al. | |
| 6,838,181 B1 | 1/2005 | Degand | |
| 6,863,928 B2 | 3/2005 | Stachowiak | |
| 6,906,287 B2 | 6/2005 | Sol | |
| 6,919,133 B2 | 7/2005 | Hartig et al. | |
| 6,919,536 B2 | 7/2005 | Veerasamy et al. | |
| 6,933,051 B2 | 8/2005 | Fleming et al. | |
| 6,946,622 B2 | 9/2005 | Degand | |
| 7,005,189 B1 * | 2/2006 | Tachibana et al. | 428/432 |
| 7,019,260 B1 | 3/2006 | Degand et al. | |
| 7,186,952 B2 | 3/2007 | Degand et al. | |
| 7,335,421 B2 | 2/2008 | Thiel et al. | |
| 7,452,603 B2 | 11/2008 | Fleury et al. | |
| 7,740,946 B2 | 6/2010 | Morimoto et al. | |
| 7,972,713 B2 * | 7/2011 | Fleury et al. | 428/699 |
| 2002/0015824 A1 | 2/2002 | Kawamoto et al. | |
| 2002/0086164 A1 | 7/2002 | Anzaki et al. | |
| 2002/0102352 A1 * | 8/2002 | Hartig et al. | 427/165 |
| 2003/0180547 A1 | 9/2003 | Buhay et al. | |
| 2004/0009356 A1 | 1/2004 | Medwick et al. | |
| 2009/0015909 A1 | 1/2009 | Fleury et al. | |

FOREIGN PATENT DOCUMENTS

| | | | |
|---|---|---|---|
| JP | 7-94263 | | 4/1995 |
| JP | 7-149545 | | 6/1995 |
| JP | 8-336923 | | 12/1996 |
| JP | 11-228185 | | 8/1999 |
| JP | 2000-294980 | | 10/2000 |
| JP | 2001-47549 | | 2/2001 |
| JP | 2002-528372 | | 9/2002 |
| WO | WO 00-40402 | | 7/2000 |
| WO | WO-0040402 | * | 7/2000 |
| WO | 03/037056 | | 5/2003 |
| WO | WO-03037056 | * | 5/2003 |
| WO | WO 03/055821 | | 7/2003 |
| WO | WO 2004/010737 | | 1/2004 |
| WO | WO 2005/051858 | | 6/2005 |

OTHER PUBLICATIONS

WO-0040402 English machine translation.*
Ohnish et al. (WO03037056) English human translation.*
Finley, J.J.; "Heat Treatment and Bending of Low-E Glass"; Thin Solid Films; vol. 351; 1999; pp. 264-273.
Gordon, Roy G.; "Criteria for Choosing Transparent Conductors"; MRS Buletin Aug. 2000, pp. 52-57.
Green, Mino, et al.; "Light transmission through perforated metal thin films made by island lithography"; Thin Solid Films; vol. 467; 2004; pp. 308-312.
Pulker, Hans K.; Chapter 9; "Application of Coatings on Glass"; Coatings on Glass; 1999; pp. 429-510.
U.S. Appl. No. 13/496,090, filed Mar. 14, 2012, Kharchenko, et al.

* cited by examiner 1  2  3  4  5

TRANSPARENT SUBSTRATE WHICH CAN BE USED ALTERNATIVELY OR CUMULATIVELY, FOR THERMAL CONTROL, FOR ELECTROMAGNETIC ARMOUR AND FOR HEATED GLAZING

CROSS REFERENCE TO RELATED APPLICATIONS

This application is a continuation application of and claims the benefit of priority under 35 U.S.C. §120 for U.S. Ser. No. 10/581,056 (now U.S. Pat. No. 7,972,713), filed Dec. 19, 2006, which is a National Stage application of PCT/FR04/50614, filed Nov. 24, 2004 and claims benefit of priority under 35 U.S.C. §119 from France 0313966, filed Nov. 28, 2003, the entire contents of each of which are incorporated herein by reference.

BACKGROUND OF THE INVENTION

I. Field of the Invention

The present invention relates to the field of glazing that can be used alternatively or cumulatively in three particular applications, namely thermal control (solar control and thermal insulation), electromagnetic shielding and heated windows, while still preferably being able to undergo at least one transformation operation involving a heat treatment at a temperature of at least 500° C. (this may be in particular a toughening, annealing or bending operation).

Thermal control is the possibility of acting on solar radiation and/or long-wavelength infrared radiation passing through glazing that separates an outdoor environment from an indoor environment, either for outward reflection of the solar radiation ("solar control" glazing) or for inward reflection of the infrared radiation of wavelength greater than 5 μm (thermal insulation with glazing called in particular "low-emissivity glazing").

Electromagnetic shielding is the possibility of eliminating, or at the very least reducing, the propagation of electromagnetic waves through glazing. This possibility is often combined with the possibility of acting on the infrared radiation passing through the glazing. This application is advantageous in the electronics field, especially for the production of electromagnetically shielded windows, also called "electromagnetic filters", which are intended for example to be placed on the faceplate of a display screen using plasma technology.

A heated window is a window whose temperature may rise when it is subjected to an electrical current. This type of window has applications in automobiles, or even in buildings, for the production of glass panes that prevent the formation, or that eliminate, ice or misting, or else that suppress the sensation of a cold wall near the glazing.

The present invention relates more particularly to a transparent substrate, especially made of glass, which is provided with a thin-film stack comprising a plurality of functional layers, said substrate being able to be used, alternatively, or cumulatively, for thermal control, electromagnetic shielding and heated windows.

II. Description of Related Art

It is known to produce thin-film stacks to achieve thermal control, more precisely solar control, which are capable of simultaneously preserving their thermal properties and their optical properties after heat treatment, while minimizing any appearance of optical defects, the challenge then being to therefore have thin-film stacks of constant optical/thermal performance, whether or not they subsequently undergo one or more heat treatments.

A first solution was proposed in European patent application No EP 718 250. This recommended the use, above the silver-based functional layer(s), of oxygen-diffusion barrier layers, especially those based on silicon nitride, and the direct deposition of silver layers on the subjacent dielectric coating, without interposition of priming layers or metal protection layers. That patent application describes in particular a stack of the type:

substrate/$Si_3N_4$ or AlN/ZnO/Ag/Nb/ZnO/$Si_3N_4$.

A second solution was proposed in European patent application No EP 847 965. This relies on stacks comprising two silver layers and describes the use both of a barrier layer on top of the silver layers (as previously) and of an absorbent or stabilizing layer which is adjacent to said silver layers and allows them to be stabilized.

That patent application describes in particular a stack of the type:

substrate/$SnO_2$/ZnO/Ag1/Nb/$Si_3N_4$/ZnO/Ag2/Nb/$SnO_2$/$Si_3N_4$.

In the above two solutions, it should be noted that the presence of the absorbent "overblocker" metal layer, made of niobium in this case, or even titanium, on the silver layers makes it possible to prevent the silver layers from coming into contact with an oxidizing or nitriding reactive atmosphere during deposition by reactive sputtering of the $SnO_2$ layer or the $Si_3N_4$ layer respectively.

A third solution has since been disclosed in International patent application No WO 03/01105. This proposes to deposit the absorbent "blocker" metal layer not on the (or each) functional layer, but underneath, so as to allow the functional layer to be stabilized during the heat treatment and to improve the optical quality of the stack after heat treatment.

That patent application describes in particular a stack of the type:

substrate/$Si_3N_4$/ZnO/Ti/Ag1/ZnO/$Si_3N_4$/ZnO/Ti/Ag2/ZnO/$Si_3N_4$.

However, within the thickness ranges disclosed, such a stack cannot be used to produce a heated window or electromagnetically shielded window of acceptable appearance (optical characteristics).

The prior art also teaches thin-film stacks on a substrate that can be used for thermal control and for heated windows when they are subjected to an electrical current. International patent application No WO 01/14136 thus discloses a stack consisting of a silver double layer that withstands a toughening heat treatment, which can be used for solar control and for producing heat when it is subjected to an electrical current. However, the resistivity of this stack does not allow true effective electromagnetic shielding to be achieved as its resistance per square R☐ cannot be close to, and a fortiori less than, 1.5 ohms per square.

In addition, for heated window application in automobiles, this high resistance per square requires the use of a battery with a high voltage across its terminals (around 42 volts, the standard voltage available on the market) in order to be able to heat over the entire height of the window. Specifically, by applying the formula $P(W)=U^2/(R\square \times h^2)$, if R☐=1.5 ohms per square, to achieve $P=600$ W/$m^2$ (the estimated power dissipated for correct heating) and to obtain a heating height h>0.8 meters, it is necessary that U>24 volts.

It is also known to produce thin-film stacks for electromagnetic shielding using a substrate provided with an electromagnetic protection stack providing good electromagnetic protection and allowing the user to easily see the image display thanks to a high light transmittance together with a low reflectance.

To achieve electromagnetic shielding, the prior art also teaches, from International patent application No WO 01/81262, a stack in particular of the type:

substrate/$Si_3N_4$/ZnO/Ag1/Ti/$Si_3N_4$/ZnO/Ag2/Ti/ZnO/$Si_3N_4$.

This stack can withstand a toughening or bending heat treatment. However, this stack does not make it possible to achieve a resistance per square that is much less than 1.8 ohms per square with optical characteristics ($T_L$, $R_L$, color, etc.) that are deemed to be acceptable, and especially a low light reflection $R_L$ in the visible.

Silver-film-based stacks are manufactured in very complex manufacturing units.

The major drawback of the prior art lies in the fact that it is essential to make major modifications to the production line when it is desired to use the production line to manufacture, on the substrate, a thin-film stack that does not have the same application(s) as the stack manufactured previously on this same line.

In general, this operation lasts from several hours to several days, it is tedious and entails a very substantial loss of money, as it is not possible to produce glazing during this transition/adjustment period.

In particular, whenever the material of the target differs from one product to the next, the chamber must be returned to atmospheric pressure before the target is changed, then the chamber must be pumped down to a vacuum (of the order of $10^{-6}$ bar), which is obviously time consuming and tedious.

BRIEF SUMMARY OF THE INVENTION

The object of the invention is therefore to alleviate these drawbacks by proposing a substrate with a thin-film stack and a manufacturing process of this substrate that make it possible to obtain a product that can be used, alternatively or cumulatively, for thermal control and/or electromagnetic shielding and/or heating.

In particular, the object of the invention is to make it possible to produce a large range of products without having to open the deposition installation in order to change target, so as to save time needed for venting to the atmosphere and above all the time to recreate a vacuum in the installation after the target has been changed.

The present invention thus proposes a particular stack, defined in terms of the composition of the various layers and their thickness, which can be used for all these applications at the same time, but also a type of stack, defined in terms of composition of the various layers, of thickness ranges and/or of optical characteristics, in which certain thickness values favor use for a given application. This stack is noteworthy in that it has a low resistance per square ($R\square<1.5$, or even $\leq 1.3\Omega$ per square) while still substantially maintaining its characteristics when it is subjected to a heat treatment of the bending or toughening type.

Thus, by virtue of this type of stack according to the invention, to manufacture stacks intended for a single specific application or only two specific applications or the three specific applications, one or more parameters can be changed, such as the thickness of certain layers, but the composition generally remains identical. A few hours thus suffice for modifying the production line and switching from the manufacture of a product having one or more preferred applications to another product having one or more other preferred applications.

Thus, one subject of the present invention is a transparent substrate, especially made of glass. This substrate is provided with a thin-film stack comprising a plurality of functional layers, said thin-film stack comprising at least three silver-based functional layers, the said stack having a resistance $R\square<1.5$, or even $\leq 1.3\Omega$ per square, and said substrate being able to undergo at least one transformation operation involving a heat treatment at a temperature of at least 500° C., so as to be able to produce, using the substrate, alternatively or cumulatively, thermal control and/or electromagnetic shielding and/or heating.

The expression "said substrate may undergo at least one transformation operation involving a heat treatment at a temperature of at least 500° C." is understood to mean the fact that the treatment does not degrade the optical quality nor does it cause the appearance of pitting visible to the naked eye and/or of haze in transmission, when carrying out a bending, toughening or annealing operation at a temperature of at least 500° C. or upper than 500° C.

Moreover, the resistance $R\square$, unless otherwise indicated, is measured before this optional heat treatment.

In a first application, for the production of automobile windows, the substrate according to the invention has a light transmission $T_L \geq 70\%$ and a resistance $R\square<1.5$, or even $\leq 1.3$, or better still $\leq 1.2\Omega$ per square.

In a second application, for the production of building windows, the transparent substrate according to the invention has a light transmission $T_L \geq 40\%$, or even $\geq 50\%$, preferably with a light reflection in the visible $R_L \leq 10\%$, or even $\leq 8\%$ and when it is combined with at least one other substrate to form a glazing assembly, this glazing assembly has a selectivity $\geq 2$, or even $>2$.

It will be recalled here that selectivity is defined by the ratio of the light transmission ($T_L$) to the solar factor (SF), i.e. $T_L$/SF, the solar factor representing the sum of the direct energy transmission ($T_E$) of the glazing and of the energy absorbed by the glazing and retransmitted into the interior of the building.

In a third application, for producing electromagnetically shielded glazing, the transparent substrate according to the invention has a light transmission $T_L \geq 40\%$, or even $\geq 50\%$, and even better still $\geq 55\%$, and a resistance $R\square \leq 1.2$, or even $\leq 1\Omega$ per square.

The major advantage resulting from the fact that the electromagnetically shielded substrate withstands a heat treatment of the toughening type or the like is that it is thus possible to use a lighter substrate. Furthermore, experiments have shown that it is always more practical, from the industrial standpoint, to use a substrate coated with a stack that withstands a heat treatment rather than to use a substrate that has undergone a heat treatment and then a stack deposited on top of it.

The substrate on which the stack is deposited is preferably made of glass.

Usually, within the context of the present invention, since the stack is deposited on the substrate, this substrate establishes a zero level and the layers deposited on top establish superjacent levels that may be numbered in an increasing order by whole numbers in order to distinguish them. In the present document, the numbering is used only to distinguish the functional layers and their order of deposition.

The term "upper layer" or "lower layer" is understood to mean a layer that is not necessarily deposited strictly on top of or beneath, respectively, the functional layer during production of the stack, it being possible for one or more layers to be inserted therebetween. Since each functional layer is associated with one or more layers deposited beneath or on top of the functional layer whose presence in the stack is justified with respect to this functional layer, it may be said that the association, i.e. functional layer with its one or more subjacent and/or superjacent layer(s), produces a "feature".

According to a variant of the invention, the substrate comprises at least four silver-based functional layers.

The total thickness of the silver-based functional layers is preferably greater than or equal to 25 nm. This total thickness is preferably substantially between 35 and 50 nm when the stack comprises three functional layers and substantially between 28 and 64 nm when the stack comprises at least four functional layers. In a variant, the sum of the thicknesses of the silver layers is less than 54 nm.

In a variant of the invention, the substrate comprises at least three identical features of functional layers, each functional layer being associated in each functional feature with at least one subjacent and/or superjacent layer.

According to another variant of the invention, at least one functional layer, and preferably each functional layer, is located between at least one lower dielectric layer and one upper dielectric layer, said dielectric layers preferably being based on ZnO, optionally doped with aluminum.

According to a variant of the invention, at least one functional layer, and preferably each functional layer, comprises an upper layer based on $Si_3N_4$, AlN or based on a mixture of the two.

According to a variant of the invention, the substrate is directly coated with a layer based on $Si_3N_4$, AlN or based on a mixture of the two.

In a variant of the invention, in at least one functional feature, and preferably in each functional feature, an upper absorbent metal layer (called an "overblocker"), preferably based on Ti, is located between the silver-based functional layer and at least one upper dielectric layer.

According to another variant of the invention, in at least one functional feature, and preferably in each functional feature, a lower absorbent metal layer (called an "underblocker"), preferably based on Ti, is located between at least one lower dielectric layer and the silver-based functional layer.

The upper or lower absorbent metal layer may also consist of a metal or of an alloy based on nickel, chromium, niobium, zirconium, tantalum or aluminum.

According to a variant of the invention, at least one functional feature, and preferably each functional feature, has the following structure: ZnO/Ag/ . . . ZnO/$Si_3N_4$ and preferably the following structure: ZnO/Ag/Ti/ZnO/$Si_3N_4$.

According to this variant, the thicknesses of the constituent layers of said feature in the case of the three-layer stack are preferably:

ZnO/Ag/ . . . ZnO/$Si_3N_4$ and preferably ZnO/Ag/Ti/ZnO/$Si_3N_4$ 5 to 15/10 to 17/ . . . 5 to 15/25 to 65 nm and preferably 5 to 15/10 to 17/0.2 to 3/5 to 15/25 to 65 nm, or 7 to 15/10 to 17/ . . . 7 to 15/25 to 65 nm and preferably 7 to 15/10 to 17/0.2 to 2/7 to 15/25 to 65 nm.

Also according to this variant, the thicknesses of the constituent layers of said feature in the case of the four-layer stack are preferably:

ZnO/Ag/ . . . ZnO/$Si_3N_4$ and preferably ZnO/Ag/Ti/ZnO/$Si_3N_4$ 5 to 15/7 to 15/ . . . 5 to 15/23 to 65 nm and preferably 5 to 15/7 to 15/0.2 to 3/5 to 15/23 to 65 nm, or 7 to 15/7 to 15/ . . . 7 to 15/23 to 65 nm and preferably 7 to 15/7 to 15/0.2 to 2/7 to 15/23 to 65 nm.

The subject of the invention is also a process for manufacturing a transparent substrate, especially made of glass, provided with a thin-film stack comprising a plurality of functional layers, characterized in that at least three silver-based functional layers are deposited on said substrate, in that said stack has a resistance R☐<1.5, or even ≦1.3☐ per square and in that said substrate may undergo at least one transformation operation involving a heat treatment at a temperature of at least 500° C., so as to make it possible to produce, alternatively or cumulatively by means of the substrate, thermal control and/or electromagnetic shielding and/or heating.

According to a variant of the invention, at least four silver-based functional layers are deposited on said substrate.

The total thickness of the silver-based functional layers deposited is preferably greater than or equal to 25 nm. This total thickness is preferably substantially between 35 and 50 nm when the stack comprises three functional layers and substantially between 28 and 64 nm when the stack comprises at least four functional layers.

According to a variant of the invention, at least three identical features of functional layers are deposited on said substrate, each functional layer being associated in each functional feature with at least one subjacent and/or superjacent layer.

According to a variant of the invention, for at least one functional layer, and preferably for each functional layer, at least one lower dielectric layer is deposited beneath said functional layer and an upper dielectric layer is deposited on said functional layer, said dielectric layers being preferably based on ZnO, optionally doped with aluminum.

According to a variant of the invention, an upper layer based on $Si_3N_4$, AlN or based on a mixture of the two is deposited on top of at least one functional layer, and preferably on top of each functional layer.

According to a variant of the invention, said substrate is directly coated with a layer based on $Si_3N_4$, AlN or based on a mixture of the two, previously deposited when all the other layers were deposited.

According to a variant of the invention, in at least one functional feature, and preferably in each functional feature, an upper absorbent metal layer, preferably based on Ti, is deposited on top of the silver-based functional layer and beneath at least one upper dielectric layer.

According to another variant of the invention, in at least one functional feature, and preferably in each functional feature, a lower absorbent metal layer, preferably based on Ti, is deposited on top of at least one lower dielectric layer and beneath the silver-based functional layer.

According to a variant of the invention, at least one functional feature deposited, and preferably each functional feature deposited, has the following structure: ZnO/Ag/ . . . ZnO/$Si_3N_4$ and preferably the following structure: ZnO/Ag/Ti/ZnO/$Si_3N_4$.

According to this variant of the invention, the thicknesses of the constituent layers deposited of said feature in the case of the three-layer stack are preferably:

ZnO/Ag/ . . . ZnO/$Si_3N_4$ and preferably ZnO/Ag/Ti/ZnO/$Si_3N_4$ 5 to 15/10 to 17/ . . . 5 to 15/25 to 65 nm and preferably 5 to 15/10 to 17/0.2 to 3/5 to 15/25 to 65 nm, or 7 to 15/10 to 17/ . . . 7 to 15/25 to 65 nm and preferably 7 to 15/10 to 17/0.2 to 2/7 to 15/25 to 65 nm.

Also according to this variant of the invention, the thicknesses of the constituent layers deposited of said feature in the case of the four-layer stack are preferably:

ZnO/Ag/ ... ZnO/Si$_3$N$_4$ and preferably ZnO/Ag/Ti/ZnO/Si$_3$N$_4$ 5 to 15/7 to 15/ ... 5 to 15/23 to 65 nm and preferably 5 to 15/7 to 15/0.2 to 3/5 to 15/23 to 65 nm, or 7 to 15/7 to 15/ ... 7 to 15/23 to 65 nm and preferably 7 to 15/7 to 15/0.2 to 2/7 to 15/23 to 65 nm.

According to a variant of the invention, the functional features are deposited by passing said substrate several times through a single manufacturing device.

According to this variant of the invention, when said stack comprises four silver-based functional layers, the features are deposited in pairs, by passing said substrate twice through a single manufacturing device under depositing conditions that are substantially identical for the two passes and preferably in keeping the substrate in vacuum between the two passes.

Also according to this variant of the invention, the thicknesses of the deposited layers are preferably substantially identical during each of the two passes.

Moreover, when the substrate according to the invention undergoes a transformation operation involving a heat treatment at a temperature of at least 500° C., its resistance R☐ is preferably reduced by at least 10%, or even at least 15%.

The subject of the invention is also glazing for thermal control and/or electromagnetic shielding and/or heating, which incorporates at least one substrate according to the invention.

The subject of the invention is also the use of the substrate according to the invention for producing, alternatively or cumulatively, thermal control and/or electromagnetic shielding and/or heating.

Advantageously, the savings made by implementing the process according to the invention when producing a stack according to the invention are enormous, since it is no longer necessary to stop the production line for several days or at least several hours when it is desired to produce stacks for one or more different application(s). A few hours suffice for modifying the production parameters on the line and to obtain a saleable product for the desired application(s).

Also advantageously, the substrate according to the invention can be used for producing monolithic glazing, double or triple glazing or laminated glazing and to achieve, alternatively or cumulatively, thermal control and/or electromagnetic shielding and/or heating.

Thus, for the automobile application, it is possible to produce laminated glazing that incorporates a substrate according to the invention, this glazing achieving, at the same time:
- thermal control (more precisely solar control for reflecting solar radiation on the outside of the vehicle);
- electromagnetic shielding for protecting the interior of the vehicle from external electromagnetic radiation; and
- heating, for melting ice or for evaporating condensation.

Likewise, for the building application, it is possible to produce double glazing that incorporates a substrate according to the invention, this glazing achieving, at the same time:
- thermal control (solar control for reflecting solar radiation on the outside of the room equipped with the glazing and/or thermal insulation for reflecting internal radiation into the room equipped with the glazing);
- electromagnetic shielding, for protecting the interior of the room equipped with the glazing from external electromagnetic radiation; and
- heating, for eliminating condensation or preventing its formation, and for preventing the sensation of a "cold wall" near the glazing.

Advantageously, such glazing incorporating a substrate according to the invention has attractive colors in transmission and in reflection.

BRIEF DESCRIPTION OF THE DRAWINGS

The present invention will be more clearly understood on reading the detailed description below of non-limiting illustrative examples and on examining the figures appended hereto.

DETAILED DESCRIPTION OF THE INVENTION

Figure 1:
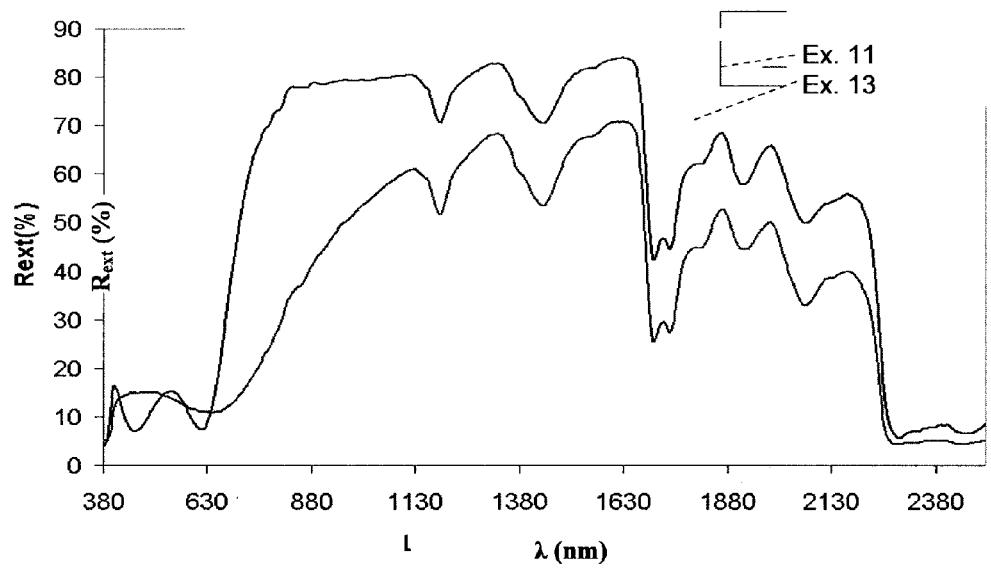
FIG. 1 illustrates the values of the light reflection to the outside of Examples 11 and 13 as a function of the wavelength λ.

1—Examples of Stacks for Heated Windows and More Particularly for Windshields Supplied with 12 V The dissipated power for correct heating is generally estimated to be 600 W/m$^2$.

Specifically, $P(W)=U^2/(R\square \times h^2)$. If U=12 V, then it is necessary that R☐=1 ohm per square for h=50 cm; h corresponding to the height of the "window" in which the heating is carried out, so as to prevent the formation of condensation and/or ice (in practice, the voltage U is from 12 to 14 V, which corresponds to the voltage across the terminals of the batteries of most motor vehicles currently produced; however, this voltage could be between 12 and 24 V.

For the automobile application, a stack having the following characteristics (as laminated glazing) may be deemed to be satisfactory:
- R☐≦1.2 ohms per square;
- good quality (no defects perceptible to the naked eye) after bending;
- T$_L$≧70% and limited R$_L$;
- color in reflection deemed to be attractive (preferably a*≦0 and b*≦0);
- satisfactory mechanical and chemical durability.

Solutions having two silver layers encapsulated in dielectrics do not make it possible to obtain both a T$_L$≧70% and a resistance R☐≦1.2Ω per square and an acceptable color.

To achieve the desired result, it appears preferable:
- to position the thin-film stack comprising the functional layers on face 3 (face 1 being the face furthest to the outside of the vehicle and face 4 being the innermost face); and
- to deposit more than two silver layers, taking into account the necessary total thickness of the silver layers.

Examples of the construction of stacks according to the invention are given below with stacks comprising three functional layers (Examples 11, 12 and 14) and with four functional layers (Examples 15 and 16), the results having been measured after a toughening operation at 620° C. for about 8 minutes.

Example 11

According to the Invention, Three-Layer

| Layer | $Si_3N_4$ | ZnO | Ag1 | ZnO | $Si_3N_4$ | ZnO | Ag2 | ZnO | $Si_3N_4$ | ZnO | Ag3 | ZnO | $Si_3N_4$ |
|---|---|---|---|---|---|---|---|---|---|---|---|---|---|
| Thickness (nm) | 37 | 7 | 12.5 | 8 | 49 | 7 | 12.5 | 8 | 53 | 7 | 12.5 | 8 | 29 | outside/glass (2.1 mm)/PVB (0.76 mm)/Ag3/Ag2/Ag1/glass (1.6 mm)/inside

Example 12

According to the Invention, Three-Layer

Same stack as in Example 11 but also with a titanium overblocker on top of each functional layer (thickness around 0.5 nm to 1 nm).

Example 13

Two-Layer Comparative Example

| Layer | $Si_3N_4$ | ZnO | Ag1 | ZnO | $Si_3N_4$ | ZnO | Ag2 | ZnO | $Si_3N_4$ |
|---|---|---|---|---|---|---|---|---|---|
| Thickness (nm) | 24 | 8 | 8 | 6 | 70 | 8 | 7 | 6 | 26 | outside/glass (2.1 mm)/PVB (0.76 mm)/Ag3/Ag2/Ag1/glass (1.6 mm)/inside with, in addition, a titanium underblocker beneath each functional layer (thickness around 0.5 nm to 1 nm)

Example 14

According to the Invention, Three-Layer

| Layer | $Si_3N_4$ | ZnO | Ag1 | ZnO | $Si_3N_4$ | ZnO | Ag2 | ZnO | $Si_3N_4$ | ZnO | Ag3 | ZnO | $Si_3N_4$ |
|---|---|---|---|---|---|---|---|---|---|---|---|---|---|
| Thickness (nm) | 37 | 7 | 12.5 | 8 | 52 | 7 | 13.5 | 8 | 52 | 7 | 14 | 8 | 31 | outside/glass (2.1 mm)/PVB (0.76 mm)/Ag3/Ag2/Ag1/glass (1.6 mm)/inside

Measured Technical Characteristics of the Laminated Glazing:

| Example | $R_\square$ ($\Omega/\square$) | $T_L$ (%) | $T_E$ (%) | Ext. $R_L$ (%) | $a^*(R_{ext})$ | $b^*(R_{ext})$ | $R_E$ (%) |
|---|---|---|---|---|---|---|---|
| 11 | 1.09 | 70.4 | 30.4 | 12.1 | −10.9 | 11.7 | 46.0 |
| 12 | 1.00 | 70.1 | 30.8 | 14.2 | −9.3 | 7.9 | 46.1 |
| 13 | 4.60 | 76.1 | 46.1 | 17.8 | −4.8 | −1.9 | 29.8 |
| 14 | 1.00 | 70.5 | 31.4 | 11.5 | −7.5 | 2.7 | 44.8 |

Example 15

According to the Invention, Four-Layer

| $Si_3N_4$ | ZnO | Ag1 | ZnO | $Si_3N_4$ | ZnO | Ag2 | ZnO | $Si_3N_4$ | ZnO | Ag3 | ZnO | $Si_3N_4$ | ZnO | Ag4 | ZnO | $Si_3N_4$ |
|---|---|---|---|---|---|---|---|---|---|---|---|---|---|---|---|---|
| 30 | 8 | 7 | 7 | 57 | 8 | 7 | 8 | 58 | 8 | 7.5 | 7 | 50 | 8 | 7.5 | 7 | 23 | outside/glass (2.1 mm)/PVB (0.76 mm)/Ag3/Ag2/Ag1/glass (1.6 mm)/inside

Example 16

According to the Invention, Four-Layer

| Si$_3$N$_4$ | ZnO | Ag1 | ZnO | Si$_3$N$_4$ | ZnO | Ag2 | ZnO | Si$_3$N$_4$ | ZnO | Ag3 | ZnO | Si$_3$N$_4$ | ZnO | Ag4 | ZnO | Si$_3$N$_4$ |
|---|---|---|---|---|---|---|---|---|---|---|---|---|---|---|---|---|
| 28 | 8 | 9 | 7 | 58 | 8 | 9 | 7 | 56 | 8 | 9 | 7 | 58 | 8 | 9 | 7 | 28 | outside/glass (2.1 mm)/PVB (0.76 mm)/Ag3/Ag2/Ag1/glass (1.6 mm)/inside

This Example 16 is obtained by passing the substrate twice through a unit for depositing a stack having two silver layers.

Measured Technical Characteristics of the Laminated Glazing:

| Example | R$_\square$ (Ω/□) | T$_L$ (%) | T$_E$ (%) | Ext. R$_L$ (%) | a*(R$_{ext}$) | b*(R$_{ext}$) | R$_E$ (%) |
|---|---|---|---|---|---|---|---|
| 15 | 1.4 | 70.1 | 38.9 | 11.3 | 6.1 | −9.9 | 31.8 |
| 16 | 1.03 | 70.3 | 31.7 | 8.3 | −1.8 | −2.5 | 40.4 |

The resistivity of the stacks, calculated from the resistance per square obtained by contactless measurement using a Nagy device, is around $4.2 \times 10^{-6}$ for the three-layer examples according to the invention, Examples 11 and 12, whereas it is around $7 \times 10^{-6}$ for the two-layer Comparative Example 13.

In the Examples 11, 12, 14, 15 and 16 according to the invention, the T$_L$, R$_1$, and color values are relatively stable.

The energy reflection values are very high, which was expected owing to the cumulative thickness of silver (3×12.75 nm). Excellent selectivity (T$_L$/SF close to or even greater than 2 in the case of a laminated specimen) was obtained.

The resistivity of the silver layers included in the three-layer stacks comprising silver layers having a thickness of about 13 nm is surprisingly low compared with the values obtained with a two-layer stack comprising silver layers having a thickness of about 8 to 9 nm.

The optical quality of the four examples according to the invention after bending is satisfactory—there is no haze or corrosion pitting observable under normal conditions.

The chemical and mechanical durability of these stacks according to the invention is also very good.

2—Examples of Stacks for Thermal-Control, Particularly Solar-Control, Glazing for Buildings The performance of a solar-controlled product is evaluated on the basis of the "selectivity" criterion, that is to say the ratio of the light transmission (T$_L$) of the glazing to the percentage amount of solar energy penetrating the inside of the building (solar factor or SF). In order to obtain the highest possible selectivity, while still maintaining a good level of light transmission (needed for the comfort of the occupants of the rooms), it is important to find glazing that will ensure as abrupt as possible a transmission cutoff between the visible range and the infrared range, and thus prevent the energy contained in this part of the spectrum being transmitted (Parry-Moon (PM) curve). The ideal spectrum for solar-controlled glazing is therefore a step function, ensuring transmission in the visible but completely cutting off the infrared.

The definition of stacks having three silver layers and four silver layers according to the invention makes it possible to increase this selectivity. This is because, for well-chosen silver thicknesses and dielectric thicknesses, the transmission spectrum of glazing comprising this type of stack approaches a step function and therefore makes it possible, for the same level of transmission, for the selectivity to be substantially increased. This can be achieved without losing the color neutrality of the glazing, both in transmission and in reflection.

Examples of stack constructions are given below with stacks comprising three functional layers (Examples 21 and 23) and with four functional layers (Example 24), these being compared with stacks having two functional layers (Examples 22 and 25), for obtaining, respectively, a transmission level of 50% (Examples 21 and 22) and a transmission level of 60% (Examples 23 to 25) and optimized selectivity.

All these examples were produced according to the following scheme:

outside/glass(6 mm)/stack/space(15 mm)/glass(6 mm)/inside, with a space filled with a mixture of 90% argon and 10% dry air, and the results given below were measured after a toughening operation at 620° C. for about 8 minutes.

Three-layer Example 21 according to the invention and comparative two-layer example 22, each having a 50% light transmission (layer thicknesses in nm):

| Ex | Glass | Si$_3$N$_4$ | ZnO | Ag1 | ZnO | Si$_3$N$_4$ | ZnO | Ag2 | ZnO | Si$_3$N$_4$ | ZnO | Ag3 | ZnO | Si$_3$N$_4$ |
|---|---|---|---|---|---|---|---|---|---|---|---|---|---|---|
| 21 | 6 mm | 35 | 10 | 16.2 | 10 | 55 | 10 | 16.2 | 10 | 55 | 10 | 16.2 | 10 | 33 |
| 22 | 6 mm | 26 | 10 | 9.2 | 10 | 63 | 10 | 19 | 10 | 20 | | | | |

Ti overblocker layer about 1 nm in thickness was also positioned just above each functional layer.

Measured Technical Characteristics:

|  | $T_L$ (%) | $\lambda_d$ (nm) | $p_e$ (%) | $R_{int}$ (%) | $L_{int}^*$ | $a_{int}^*$ | $b_{int}^*$ | $R_{ext}$ (%) | $L_{ext}^*$ | $a_{ext}^*$ | $b_{ext}^*$ | $T_E$ (PM, mass 2) | $T_L/T_E$ |
|---|---|---|---|---|---|---|---|---|---|---|---|---|---|
| Ex. 21 | 50.2 | 501 | 6.6 | 12.7 | 42.3 | −3.4 | −3.1 | 13.8 | 43.9 | −1.0 | −1.3 | 20.0 | 2.51 |
| Ex. 22 | 49.3 | 514 | 3.3 | 23.0 | 55.1 | 0.7 | 5.9 | 19.2 | 50.9 | −3.1 | −9.2 | 24.2 | 2.04 |

The dominant color expressed by $\lambda_d$ and the purity expressed by $p_e$ are measured here in transmission.

Three-layer Example 23 according to the invention, four-layer Example 24 according to the invention and comparative two-layer Example 25, each having a 60% light transmission (layer thicknesses in nm):

| Ex | $Si_3N_4$ | ZnO | Ag1 | ZnO | $Si_3N_4$ | ZnO | Ag2 | ZnO | $Si_3N_4$ | ZnO | Ag3 | ZnO | $Si_3N_4$ | ZnO | Ag4 | ZnO | $Si_3N_4$ |
|---|---|---|---|---|---|---|---|---|---|---|---|---|---|---|---|---|---|
| 23 | 30 | 15 | 14 | 15 | 50 | 15 | 14 | 15 | 50 | 15 | 14 | 15 | 30 | | | | |
| 24 | 24 | 15 | 12.5 | 15 | 52 | 15 | 12.5 | 15 | 52 | 15 | 12.5 | 15 | 52 | 15 | 12.5 | 15 | 24 |
| 25 | 25 | 10 | 9.5 | 15 | 52 | 15 | 17 | 15 | 17 | | | | | | | | |

A Ti overblocker layer about 1 nm in thickness was also positioned just over each functional layer.

Measured Technical Characteristics:

|  | $T_L$ (%) | $\lambda_d$ (nm) | $p_e$ (%) | $R_{int}$ (%) | $L_{int}^*$ | $a_{int}^*$ | $b_{int}^*$ | $R_{ext}$ (%) | $L_{ext}^*$ | $a_{ext}^*$ | $b_{ext}^*$ | $T_E$ (PM, mass 2) | $T_L/T_E$ |
|---|---|---|---|---|---|---|---|---|---|---|---|---|---|
| 23 | 57.0 | 541 | 3.5 | 12.3 | 41.7 | −0.9 | −8.6 | 12.7 | 42.3 | −2.6 | −8.7 | 25.2 | 2.26 |
| 24 | 58.0 | 537 | 2.9 | 12.6 | 42.2 | −6.6 | 0.7 | 12.2 | 41.5 | −4.5 | −1.7 | 24.8 | 2.34 |
| 25 | 60.1 | 515 | 3.2 | 19.0 | 50.7 | 2.1 | 1.3 | 15.7 | 46.6 | −2.2 | −9.8 | 29.5 | 2.04 |

As previous, the dominant color expressed by $\lambda_d$ and the purity expressed by $p_e$ are measured here in transmission.

Figure 2:
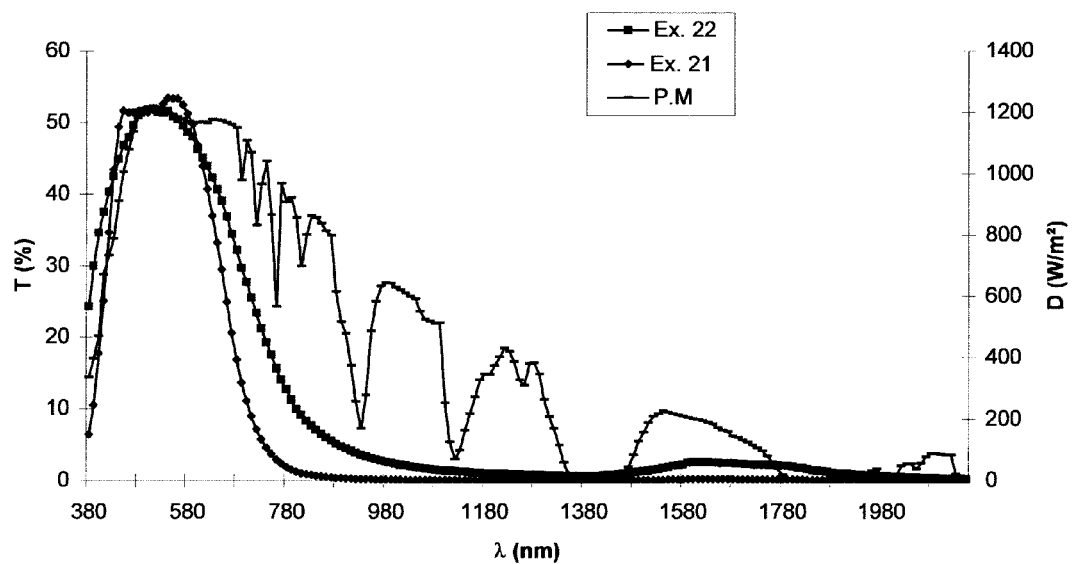
FIG. 2 illustrates the light transmission values, of Example 21 according to the invention and Comparative Example 22 respectively, as a function of the wavelength λ, and also the Parry-Moon curve for the solar energy density D as a function of the wavelength λ.
Figure 3:
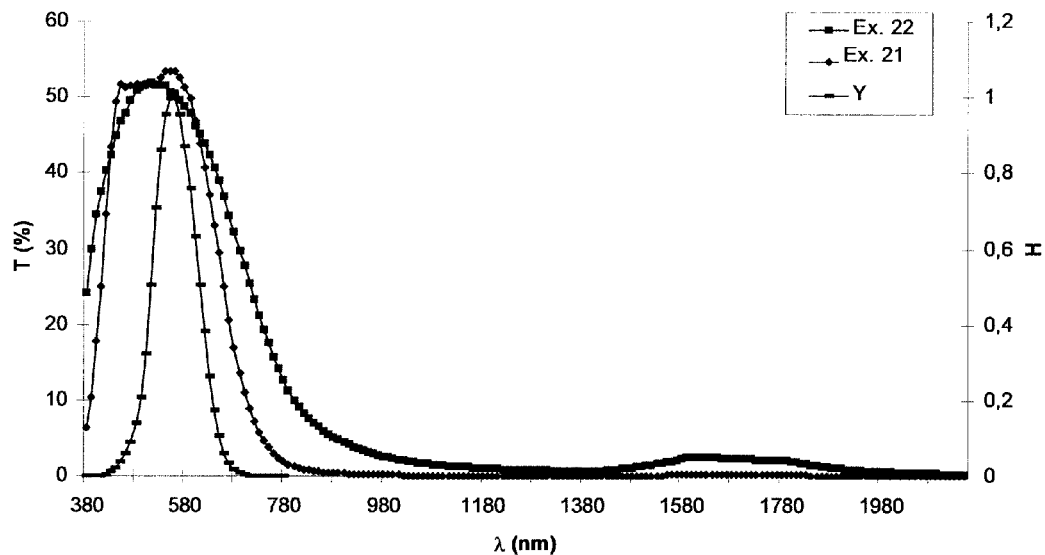
FIG. 3 illustrates the light transmission values, of Example 21 according to the invention and Comparative Example 22 respectively, as a function of the wavelength λ and also the sensitivity to the human eye, Y, on a normalized scale H.
Figure 4:
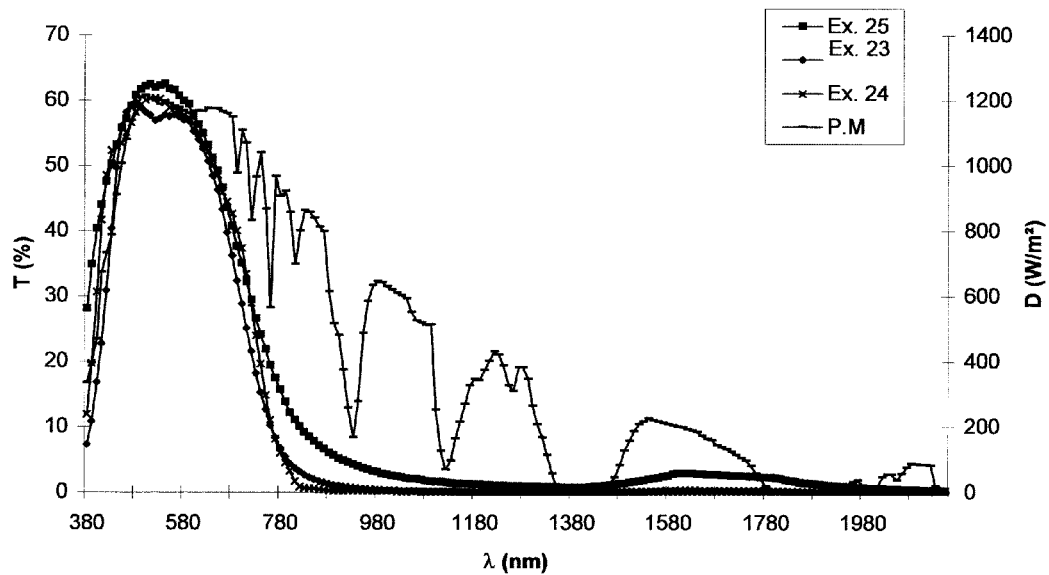
FIG. 4 illustrates the light transmission values, of Examples 23 and 24 according to the invention and Comparative Example 25 respectively, as a function of the wavelength λ, and also the Parry-Moon curve for the solar energy density D as a function of the wavelength λ.

Comparison between the spectra of Examples 21, 23 and 24 according to the invention with Comparative Examples 22 and 25 over the entire solar spectrum, illustrated in FIGS. 2 to 4, clearly shows that the three-layer stacks make it possible to approach the step function (very sudden drop in transmission at around 780 nm—end of the visible range and start of the infrared range). The same applies to the four-layer stacks. Moreover, this increase in selectivity is not obtained to the detriment of the colorimetric response of the glazing, the color in external reflection of the glazing being neutral (in the L*a*b* system), a* and b* being negative and of low absolute value. In addition, the color in transmission does not have a higher purity, which allows the occupants of rooms to appreciate the outdoor environment in their true colors. This point can be seen in FIG. 3, which shows the superposition of the spectra of Examples 21 and 22 and the sensitivity of the human eye. In fact, this graph shows that the optical filter produced using the thin-film stack of Example 21 is broader, in terms of wavelength, than the distribution of the sensitivity of the human eye.

3—Examples of Stacks for Electromagnetically Shielded Glazing and More Particularly for Plasma Screens The structure of the stack produced for verifying the benefit of the invention in the case of electromagnetic shielding is the following:

clear glass substrate (2 mm)/thin-film stack having at least three functional layers.

The toughening carried out prior to the measurements was introduced by annealing the substrate provided with the stack at a temperature of about 620° C. for 5 minutes.

Example 31

According to the Invention, Four-Layer

| $Si_3N_4$ | ZnO | Ag1 | ZnO | $Si_3N_4$ | ZnO | Ag2 | ZnO | $Si_3N_4$ | ZnO | Ag3 | ZnO | $Si_3N_4$ | ZnO | Ag4 | ZnO | $Si_3N_4$ |
|---|---|---|---|---|---|---|---|---|---|---|---|---|---|---|---|---|
| 22 | 15 | 12.5 | 10 | 48 | 15 | 12.5 | 10 | 43 | 15 | 12.5 | 10 | 48 | 15 | 12.5 | 10 | 22 | with furthermore a titanium overblocker above each functional layer (thickness around 0.5 nm to 1 nm).

Example 32

According to the Invention, Four-Layer

| Si$_3$N$_4$ | ZnO | Ag1 | ZnO | Si$_3$N$_4$ | ZnO | Ag2 | ZnO | Si$_3$N$_4$ | ZnO | Ag3 | ZnO | Si$_3$N$_4$ | ZnO | Ag4 | ZnO | Si$_3$N$_4$ |
|---|---|---|---|---|---|---|---|---|---|---|---|---|---|---|---|---|
| 30 | 15 | 14 | 10 | 65 | 15 | 14 | 10 | 60 | 15 | 14 | 10 | 65 | 15 | 14 | 10 | 30 | with furthermore a titanium overblocker above each functional layer (thickness around 0.5 nm to 1 nm).

Example 33

According to the Invention, Four-Layer

| Si$_3$N$_4$ | ZnO | Ag1 | ZnO | Si$_3$N$_4$ | ZnO | Ag2 | ZnO | Si$_3$N$_4$ | ZnO | Ag3 | ZnO | Si$_3$N$_4$ | ZnO | Ag4 | ZnO | Si$_3$N$_4$ |
|---|---|---|---|---|---|---|---|---|---|---|---|---|---|---|---|---|
| 17 | 15 | 10 | 15 | 37 | 15 | 10 | 15 | 34 | 15 | 10 | 15 | 37 | 15 | 10 | 15 | 17 | with furthermore a titanium overblocker above each functional layer (thickness around 0.5 nm to 1 nm).

Technical Characteristics Measured After Annealing:

| Example | R$_\square$ ($\Omega/\square$) | Resistivity ($10^{-6}$ $\Omega \cdot$ cm) | T$_L$ (%) | R$_L$ (%) | $\lambda_d$ (nm) | p$_e$ (%) |
|---|---|---|---|---|---|---|
| 31 | 0.9 | 4.5 | 72 | 6 | 490 | 9 |
| 32 | 0.7 | 3.9 | 70 | 10 | 450 | 5 |
| 33 | 1.2 | 4.8 | 72 | 7 | 520 | 5 |

The dominant color expressed by $\lambda_d$ and the purity expressed by $p_e$ are measured here in reflection.

It may be seen that the toughening operation lowers the resistivity of the silver and slightly modifies the optical properties of the stack. Specifically, in the case of Example 31, the resistance of this stack before annealing was R$\square$=1.1$\Omega$/$\square$ (for a resistivity of 5.5×10$^{-6}$ ohms·cm) i.e. a reduction of about 18%; in the case of Example 32, the resistance of this stack before annealing was R$\square$=0.9$\Omega$/$\square$ (for a resistivity of 5.0×10$^{-6}$ ohms·cm) i.e. a reduction of about 22%; and in the case of Example 33, the resistance of this stack before annealing was R$\square$=1.5$\Omega$/$\square$ i.e. a reduction of about 20%. However, the toughening operation results in no major change to the color.

Figure 5:
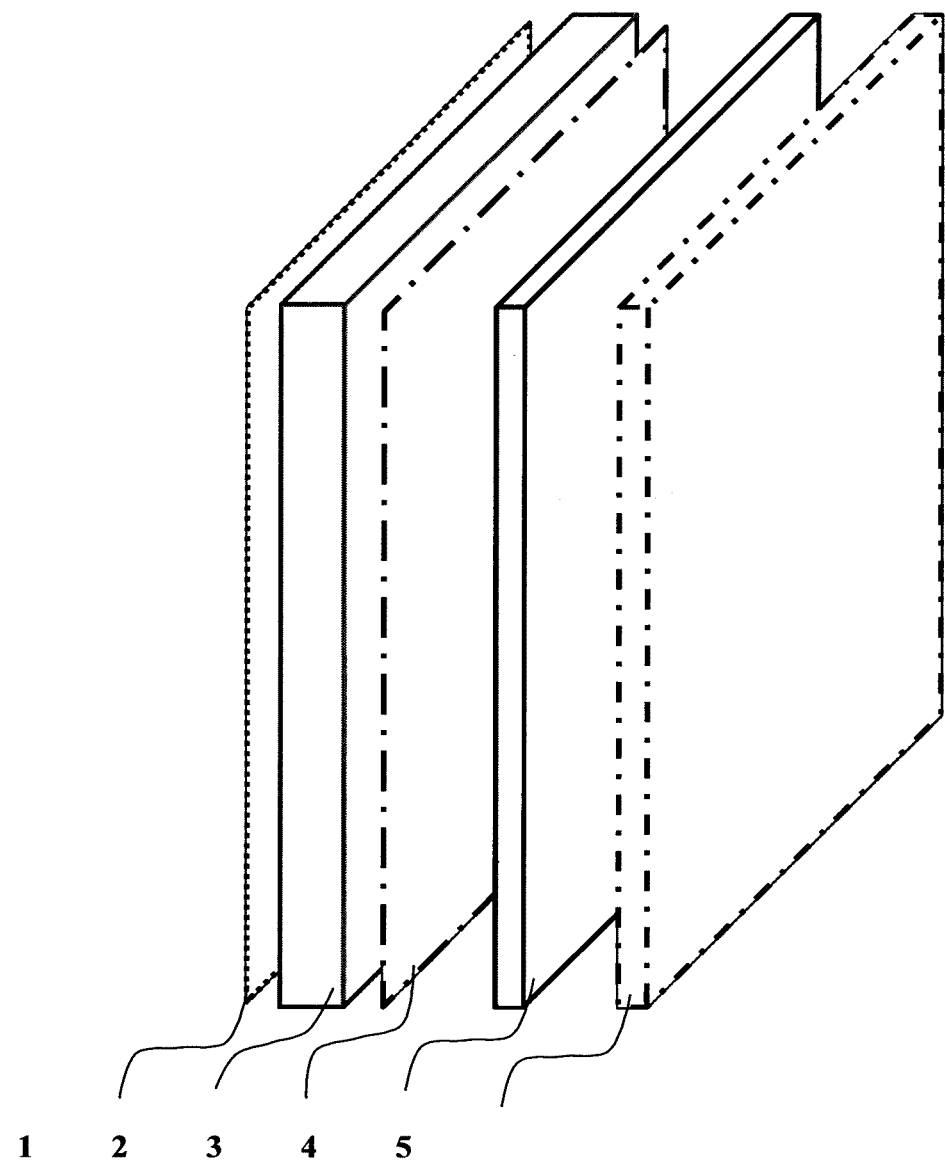
FIG. 5 illustrates a diagram of an electromagnetically shielded glazing assembly employing the substrate according to the invention.

The stack according to the invention may be used in an assembly having, for example, the structure illustrated in FIG. 5, so as to produce an electromagnetic filter for a screen using plasma technology. This assembly comprises:
1—an optional antireflection layer;
2—a substrate made of clear glass, but which could also be tinted;
3—a thin-film stack having at least three functional layers;
4—a sheet of plastic, made of PVB, which could also optionally be made of PSA;
5—an optional PET film.

The thin-film stack is thus positioned on face 2 of the assembly.

The substrate receiving the stack can be toughened after the stack has been deposited.

The present invention has been described in the foregoing by way of example. Of course, a person skilled in the art is capable of realizing various alternative embodiments of the invention without thereby departing from the scope of the patent as defined by the claims.

The invention claimed is:

1. A glazing for thermal control and heating, comprising:
a transparent substrate including glass and provided with a thin-film stack including a plurality of functional layers, the thin-film stack including at least three silver-based functional layers,
wherein the thin-film stack has a resistance R<1.5$\Omega$ per square,
wherein the glazing has a selectivity greater than or equal to 2, and
wherein the selectivity is defined as the ratio of a light transmission T$_L$ to a solar factor SF, said solar factor SF being defined as the sum of a direct energy transmission T$_E$ of the glazing and an energy absorbed by the glazing and retransmitted.

2. The glazing as claimed in claim 1, wherein a light transmission T$_L$ of the transparent substrate is T$_L$≧70%.

3. The glazing of claim 1, wherein a light transmission T$_L$ of the transparent substrate is T$_L$≧40%.

4. The glazing as claimed in claim 1, wherein a light transmission T$_L$ of the transparent substrate is T$_L$≧40% and a resistance of the transparent substrate is R≦1.1$\Omega$ per square.

5. The glazing as claimed in claim 1, wherein the transparent substrate includes at least four silver-based functional layers.

6. The glazing as claimed in claim 1, wherein at least one functional layer comprises an upper layer based on Si$_3$N$_4$, AlN, or a mixture of Si$_3$N$_4$ and AlN.

7. The glazing as claimed in claim 1, wherein the transparent substrate is directly coated with a layer based on Si$_3$N$_4$, AlN or a mixture of Si$_3$N$_4$ and AlN.

8. The glazing as claimed in claim 1,
wherein the transparent substrate includes an identical functional feature for each of the at least three silver-based functional layers, and
wherein each functional feature associates a corresponding silver-based functional layer with at least one subjacent or superjacent layer.

9. The glazing as claimed in claim 1, wherein a total thickness of the at least three silver-based functional layers is greater than or equal to 25 nm.

10. The glazing as claimed in claim 9, wherein a total thickness of the at least three silver-based functional layers is between 35 and 50 nm when the stack comprises three functional layers.

11. The glazing as claimed in claim 9, wherein a total thickness of the at least three silver-based functional layers is between 28 and 64 nm when the stack comprises at least four functional layers.

12. The glazing as claimed in claim 1, wherein at least one of the plurality of functional layers, is located between at least one lower dielectric layer and at least one upper dielectric layer.

13. The glazing as claimed in claim 12, wherein said dielectric layers are based on ZnO.

14. The glazing as claimed in claim 13, wherein said dielectric layers are doped with aluminum.

15. The glazing as claimed in claim 1,
wherein the transparent substrate includes a functional feature for each of the at least three silver-based functional layers, and
wherein each functional feature associates a corresponding silver-based functional layer with at least one subjacent or superjacent layer.

16. The glazing as claimed in claim 15, wherein, at least one of the functional features includes an upper absorbent metal layer located between one of the silver-based functional layers and at least one upper dielectric layer.

17. The glazing as claimed in claim 16, wherein the upper absorbent metal layer is based on Ti.

18. The glazing as claimed in claim 15, wherein, at least one of the functional features includes a lower absorbent metal layer located between at least one lower dielectric layer and one of the silver-based functional layers.

19. The glazing as claimed in claim 18, wherein the lower absorbent metal layer is based on Ti.

20. The glazing as claimed in claim 15, wherein at least one of the functional features has a structure beginning with ZnO/Ag and ending with $ZnO/Si_3N_4$.

21. The glazing as claimed in claim 20, wherein
the thin-film stack includes three silver-based functional layers, and
thicknesses of constituent layers of the at least one of the functional features with the structure beginning with ZnO/Ag and ending with $ZnO/Si_3N_4$ are 5 to 15/10 to 17 nm and 5 to 15/25 to 65 nm respectively.

22. The glazing as claimed in claim 20, wherein
the thin-film stack includes four silver-based functional layers, and
thicknesses of constituent layers of the at least one of the functional features with the structure beginning with ZnO/Ag and ending with $ZnO/Si_3N_4$ are 5 to 15/10 to 17 nm and 5 to 15/25 to 65 nm respectively.

23. The glazing as claimed in claim 20, wherein the structure of the at least one of the functional features is $ZnO/Ag/Ti/ZnO/Si_3N_4$.

24. The glazing as claimed in claim 23, wherein thicknesses of constituent layers of the at least one of the functional features having the structure $ZnO/Ag/Ti/ZnO/Si_3N_4$ are 5 to 15/10 to 17/0.2 to 3/5 to 15/25 to 65 nm.

25. The glazing as claimed in claim 23, wherein
the thin-film stack includes three silver-based functional layers, and
thicknesses of constituent layers of the at least one of the functional features having the structure $ZnO/Ag/Ti/ZnO/Si_3N_4$ are 5 to 15/10 to 17/0.2 to 3/5 to 15/25 to 65 nm.

26. The glazing as claimed in claim 23, wherein
the thin-film stack includes four silver-based functional layers, and
thicknesses of constituent layers of the at least one of the functional features having the structure $ZnO/Ag/Ti/ZnO/Si_3N_4$ are 5 to 15/7 to 15/0.2 to 3/5 to 15/23 to 65 nm.

* * * * *